United States Patent
Sidenmark et al.

(10) Patent No.: US 12,168,967 B2
(45) Date of Patent: Dec. 17, 2024

(54) POWER TAKE-OFF DEVICE AND WAVE ENERGY CONVERTER UNIT COMPRISING SUCH POWER TAKE-OFF DEVICE

(71) Applicant: Ocean Harvesting Technologies AB, Karlskrona (SE)

(72) Inventors: Mikael Sidenmark, Listerby (SE); Markus Wallentin, Gothenburg (SE)

(73) Assignee: Ocean Harvesting Technologies AB, Karlskrona (SE)

( * ) Notice: Subject to any disclaimer, the term of this patent is extended or adjusted under 35 U.S.C. 154(b) by 0 days.

(21) Appl. No.: 18/283,021

(22) PCT Filed: Mar. 24, 2022

(86) PCT No.: PCT/EP2022/057797
§ 371 (c)(1),
(2) Date: Sep. 20, 2023

(87) PCT Pub. No.: WO2022/200514
PCT Pub. Date: Sep. 29, 2022

(65) Prior Publication Data
US 2024/0309838 A1  Sep. 19, 2024

(30) Foreign Application Priority Data
Mar. 24, 2021 (SE) .................................. 2150343-8

(51) Int. Cl.
*F03B 13/18* (2006.01)
(52) U.S. Cl.
CPC .................................. *F03B 13/18* (2013.01)
(58) Field of Classification Search
CPC ........ F03B 13/26; F03B 13/16; F03B 13/188; F03B 13/1885; F03B 13/20; F03B 15/00;
(Continued)

(56) References Cited

U.S. PATENT DOCUMENTS

| 3,126,830 A | 3/1964 | Dilliner |
| 10,047,717 B1 * | 8/2018 | Phillips .................. F03B 13/20 |

(Continued)

FOREIGN PATENT DOCUMENTS

| GB | 2567994 A | 5/2019 |
| WO | WO2007019640 A1 | 2/2007 |

(Continued)

OTHER PUBLICATIONS

PCT Search Report and Written Opinion for PCT/EP2022/057797 dated Sep. 12, 2022, (10 pages).

*Primary Examiner* — Shafiq Mian
(74) *Attorney, Agent, or Firm* — Reising Ethington P.C.

(57) ABSTRACT

A power take-off device for use in a wave energy converter unit having a buoy includes a power take-off hull connectable to a mooring device, and connected to or connectable to the buoy, preferably by a link rope, and a power extracting device adapted to extract power as the buoy moves with the waves, by applying up to a predetermined maximum control force. A two-stage end-stop cushioning system comprises a first stage end-stop cushioning device having a first fluid cylinder adapted to apply an additional deceleration force on the device above the maximum control force, and a second stage end-stop cushioning device adapted to be extended like a spring in an end-stop operation after the first stage has been activated and when the power take-off force is higher than the above the maximum control force, to hold the buoy submerged through the crest of a large wave.

17 Claims, 14 Drawing Sheets

(58) Field of Classification Search
CPC ...... F03B 13/24; F03B 13/1845; F03B 13/14; F05B 2240/93; F05B 2260/4031; F05B 2220/706; F05B 2240/97; F05B 2280/5001; Y02E 10/38; Y02E 10/32
See application file for complete search history.

(56) References Cited

U.S. PATENT DOCUMENTS

| | | | | |
|---|---|---|---|---|
| 2010/0219065 | A1* | 9/2010 | Burns | F03B 13/189 210/170.11 |
| 2013/0200626 | A1* | 8/2013 | Sidenmark | F03B 13/1885 60/504 |
| 2019/0360452 | A1* | 11/2019 | Qu | F03B 13/1875 |
| 2021/0404436 | A1* | 12/2021 | Lehmann | F03B 13/186 |

FOREIGN PATENT DOCUMENTS

| | | |
|---|---|---|
| WO | WO2011149397 A1 | 12/2011 |
| WO | WO2017217919 A1 | 12/2017 |

\* cited by examiner

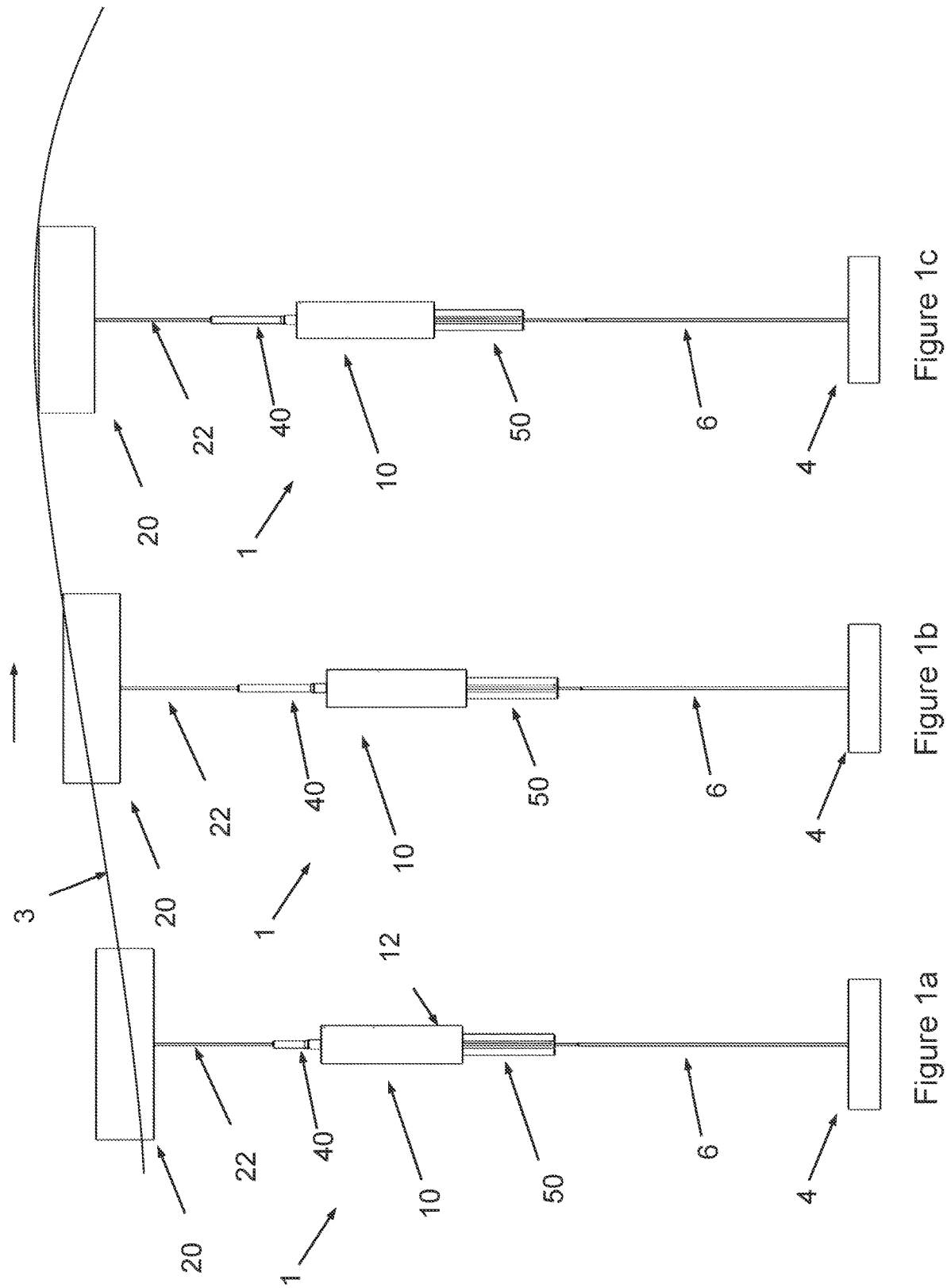

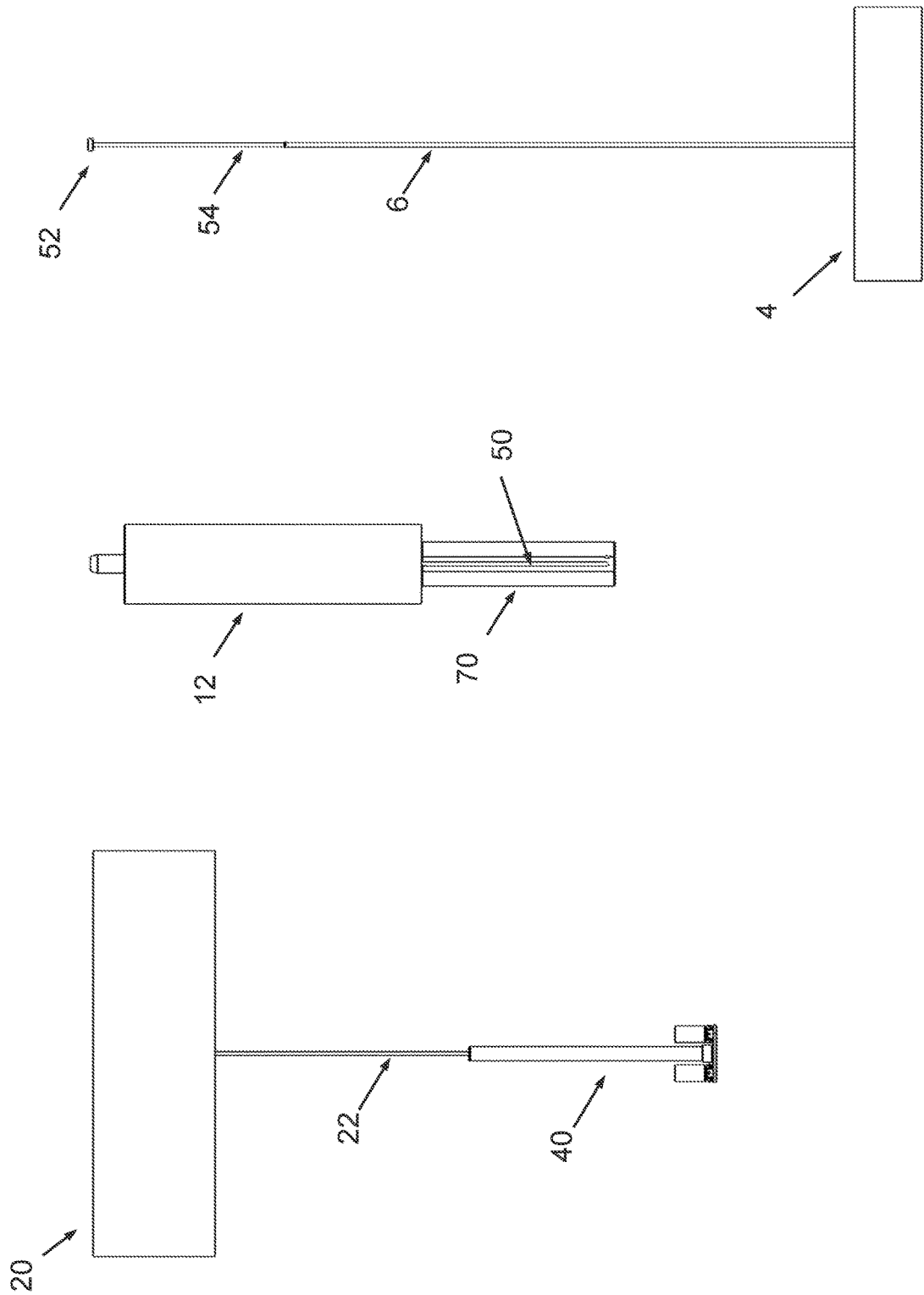

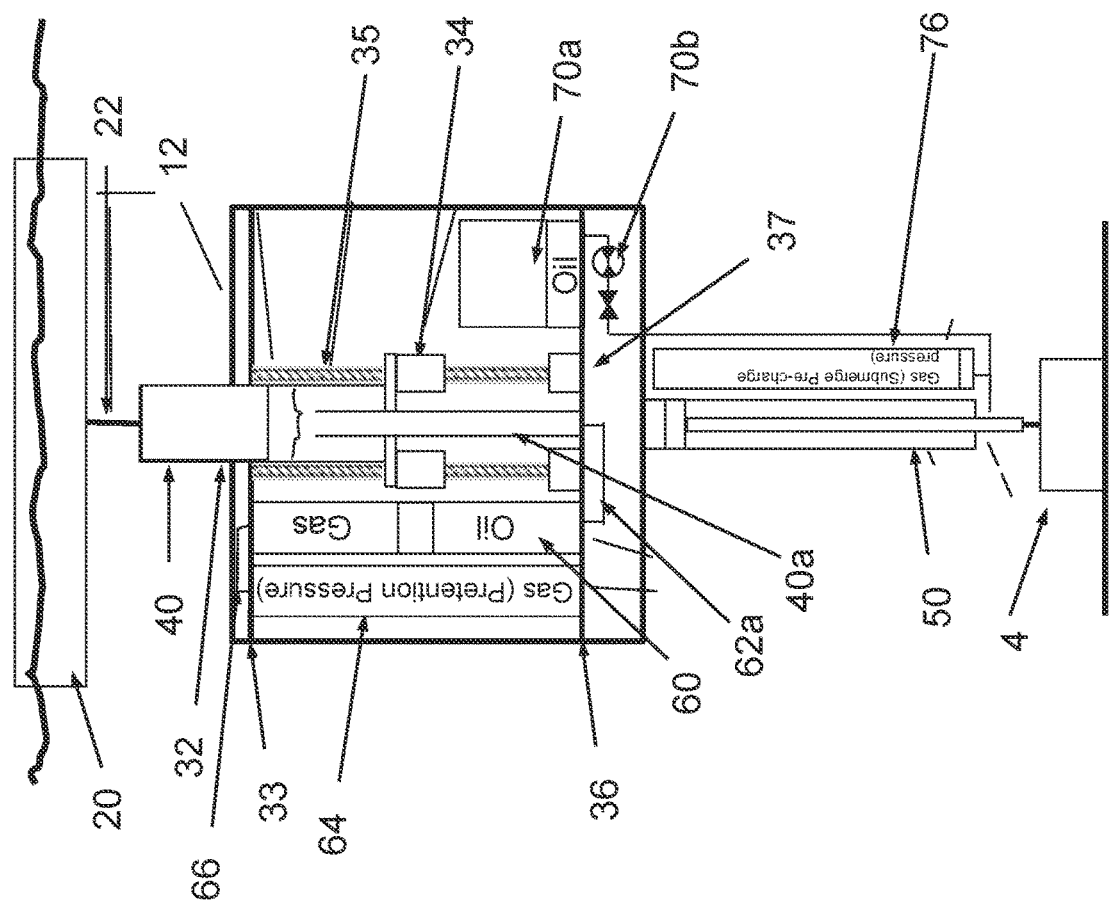

POWER TAKE-OFF DEVICE AND WAVE ENERGY CONVERTER UNIT COMPRISING SUCH POWER TAKE-OFF DEVICE

TECHNICAL FIELD

The present disclosure relates generally to wave energy conversion and more particularly to a power take-off (PTO) device with features to provide advanced reactive PTO force control. A wave energy converter unit comprising a PTO device is also provided.

BACKGROUND

Different types of wave energy converters (WECs) have been proposed, in which a power take-off with advanced reactive PTO force control capabilities is provided to increase the energy yield.

One challenge is to design such PTO system with low cost, to enable energy to be produced at a competitive price, while also ensuring survival in extreme wave conditions. Another challenge is to design the PTO system to be small enough for road transportation and to be easy to install, which is essential when large volumes of PTO systems need to be transported to various locations for installation in a commercial scale deployment of wave energy.

SUMMARY

An object of at least some implementations of the present disclosure is to provide an improved design of a wave energy converter PTO device having an improved end-stop cushioning system to hold the buoy submerged through the crest of large waves. Another object is to provide a modular compact design of the power take-off that is suitable for transportation to the installation sites.

The disclosure is based on the insight that a two-stage end-stop cushioning system, wherein the first stage is located in the heave system in the form of an end stop cushion which is known in itself, and a second stage located in the level system in the form of a pneumatic pre-tensed spring which is known in itself. In an end-stop situation, the increased deceleration (damping) force of the first stage in the heave system activates the spring function in the second stage, whereby the PTO system moves up together with the buoy while breaking its motion with less deceleration force over a longer distance. The purpose of the disclosure is to reduce the length of the end stop cushion in the first stage, and thereby the total length of the heave system and the cost thereof, and instead use a relatively long stroke length in the level system to decelerate and stop the buoy motion with a spring force, thereby reducing the maximum deceleration force through the PTO system as well as enable the system to continue to produce energy seamlessly after each end stop event also in extreme wave conditions.

According to a first aspect of the disclosure, there is provided a power take-off device for use in a wave energy converter unit having a buoy, the power take-off device comprising a power take-off hull connectable to a mooring device, the power take-off device being connected to or connectable to the buoy, preferably by means of a link rope, a power extracting device connected to the power take-off hull and adapted to extract power as the buoy moves with the waves, by applying up to a predetermined maximum control force, and an end-stop cushioning system comprising: a first stage end-stop cushioning device comprising a first fluid cylinder, preferably a hydraulic cylinder, having a first end and a second end and being adapted to apply, in an end-stop operation, an additional deceleration force on the power take-up device above the predetermined maximum control force, the power take-off device being characterized by a second stage end-stop cushioning device comprising a second fluid cylinder, preferably a hydraulic cylinder, having a first end and a second end and being adapted to be extended like a spring in an end-stop operation after the first stage has been activated and when the power take-off force is higher than the above said predetermined maximum control force, to hold the buoy submerged through the crest of a large wave, wherein the first end of the first fluid cylinder is connected, directly or indirectly, to the first end of the second fluid cylinder, wherein each of the second ends of the first fluid cylinder and the second fluid cylinder is connected to one of the buoy and the mooring device.

In a preferred embodiment, the first fluid cylinder is connected between the buoy, preferably by means of a link rope, and the power take-off hull, and the second fluid cylinder is connected between the power take-off hull and the mooring device, preferably by means of a mooring line, whereby the power take-off hull is essentially vertically fixed against the wave motion. Alternatively, the power take-off hull is essentially fixedly connected to the buoy and the first fluid cylinder is connected between the power take-off hull and the second fluid cylinder, which in turn is connected to the mooring device, preferably by means of a mooring line. Preferably, a piston rod of the first fluid cylinder is connected to the buoy.

In a preferred embodiment, the first stage end-stop cushioning device comprises the first fluid cylinder being a hydraulic pre-tension cylinder having a cylinder tube connectable to the buoy, with the cylinder tube being guided in the power take-off hull between a retracted position and an extended position, the cylinder tube having a fluid chamber, having a piston rod fixed to the power take-off hull, a primary fluid port between the fluid chamber and a pre-tension gas accumulator assembly, being closed when the piston has reached the end of normal stroke, and a secondary fluid port connecting the pre-tension cylinder chamber with the pre-tension gas accumulator assembly, adapted to provide an increased pressure in the fluid chamber, only in the direction when the fluid is moving from the pre-tension cylinder to the gas accumulator assembly, when the primary fluid port is closed, a pre-tension gas accumulator assembly comprising a piston accumulator containing a fluid chamber and a gas chamber separated by a piston, with the fluid chamber being connected to the pre-tension cylinder fluid chamber, and gas containers, preferably 3 cylinders, with an additional volume of compressed gas being connected to the piston accumulator gas chamber.

In a preferred embodiment, the piston rod is hollow, having a fluid chamber connecting the pre-tension cylinder chamber with the piston accumulator fluid chamber by means of a primary fluid port, preferably in the form of slots located at a distance from the piston, and wherein a submerge cushion cavity, being defined by a cylinder closely fitted around the hollow piston rod, is attached to the bottom of the pre-tension cylinder, wherein the cushion cavity cylinder completely covers the primary fluid ports during end-stop operation.

In a preferred embodiment, the secondary fluid port comprises an over pressure relief valve is provided between the pre-tension cylinder fluid chamber and the hollow piston rod fluid chamber by which, when the primary fluid ports are fully closed, fluid is forced from the pre-tension cylinder fluid chamber into the hollow piston rod fluid chamber, giving a constant pressure drop and thereby an increased force to decelerate and stop the relative motion between the pre-tension cylinder and the hollow piston rod.

In a preferred embodiment, the first-stage end-stop cushion device comprises end-stop buffers, preferably impact buffers, such as Polyurethane-Elastomer buffers or hydraulic buffers, adapted to decelerate and stop relative motion between the first fluid cylinder and the power take-off hull during end-stop operation.

In a preferred embodiment, a pre-tension gas accumulator assembly has a fluid/volume ratio of preferably between 1:5 and 1:10, more preferably between 1:6 and 1:8, and most preferably about 1:7.

In a preferred embodiment, ball screw actuators are provided to assist the first stage submerge end-stop cushion device by applying, preferably maximum damping when the pre-tension cylinder gets close to the end-stop cushion, preferably 100 mm before the fluid port is closed and the cushion sleeve enters the submerge cushion cavity.

In a preferred embodiment, the second-stage end-stop cushioning device comprises a hydraulic accumulator, preferably a hydraulic piston gas accumulator, preferably connected to an external gas container, and connected to the second fluid cylinder, preferably with a pre-charge pressure corresponding to slightly higher force than the maximum PTO control force, so that the accumulator starts charging with fluid as a result of the increased force from the first stage end stop cushion.

In a preferred embodiment, the piston rod of the second fluid cylinder can extend like a spring up to a maximum distance, which preferably is between 1 and 2 meters, while the force increases gradually with the reducing volume of the gas accumulator, until the buoy motion stops and the position of the buoy is held through crests of large waves.

In a preferred embodiment, the maximum end-stop force required with the end-stop cushioning system is approximately 4 MN while the maximum total PTO control force is approximately 2 MN.

In a preferred embodiment, a level cylinder is adapted to, during operation, be actuated by a level pump to adjust the height of the power take-off device above the seabed.

According to a second aspect of the disclosure, a wave energy converter unit is provided, wherein the power take-off device is connected to a buoy and a mooring device attached to a foundation on a seabed.

In a preferred embodiment, a level cylinder and hydraulic accumulator assembly are provided as a separate part attached to the power take-off hull.

BRIEF DESCRIPTION OF THE DRAWINGS

The disclosure is now described, by way of example, with reference to the accompanying drawings, in which:

FIGS. 1a, 1b and 1c show a complete single WEC unit with buoy, PTO system and seabed foundation, in different phases of an operation cycle.

FIG. 2a shows the buoy of FIG. 1 attached with a pre-tension cylinder and ball nut assembly, which moves with the waves.

FIG. 2b shows the PTO system of FIG. 1, which is vertically fixed against wave motion, but the height of which above the seabed can be adjusted with a level system.

FIG. 2c shows the seabed foundation of FIG. 1 attached with a piston rod of a level cylinder by a mooring rope, having a quick connector to the seabed foundation.

FIG. 5a shows a schematic view of the complete WEC unit.

FIG. 9b shows a cross-sectional close-up view of the cleaning cap assembly of FIG. 9a.

DETAILED DESCRIPTION

Figure 2E:
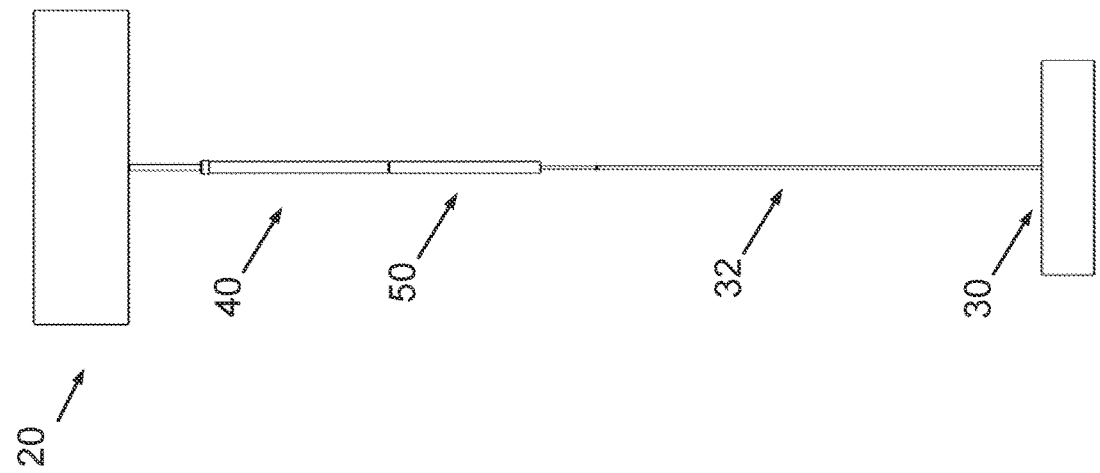
FIGS. 2d and 2e show the two-stage end-stop cushioning system comprising two fluid cylinders.

In the following, an improved modular design of a power take-off (PTO) device of a WEC unit, comprising a hydraulic pre-tension system, a level system and a two-stage end-stop cushioning system, will be described in detail.

When references are made to directions, such as "up" or "top", these refer to the directions shown in the figures, i.e., after installation of the WEC unit at sea.

When references are made to a fluid cylinder, this refers to a single acting pneumatic or hydraulic cylinder comprising two moving parts, the first part being a tube with a cap-end and a rod-end, the second part being a piston rod and a piston, whereby the piston rod goes through the rod-end of the tube. The fluid port can be located either in the rod-end of the tube, or in the top of a hollow piston rod at a distance from the piston, through which fluid can enter and exit the fluid chamber of the cylinder, whereby the retraction force is defined by the pressure of the fluid acting on the piston ring area.

FIGS. 1a-c show a complete wave energy converter (WEC) unit 1 in different operation phases with a prime mover in the form of a buoy 20 attached to a Power Take-Off (PTO) device or system 10 with a PTO hull 12, preferably by means of a link rope 22, providing tensile stiffness and bending flexibility. A mooring rope 6 connects the bottom end of the PTO system 10 to a mooring device 4 in the form of a gravity-based seabed foundation, or any other type of suitable anchoring device. A level system comprising a level cylinder 50 is provided to adjust the level of the PTO system 10.

FIGS. 2a-c show the three main parts of the system, FIG. 2a showing the buoy 20 attached to an end of a first cylinder in the form of a pre-tension cylinder 40, FIG. 2b showing the PTO hull 12 and level system 70, comprising a second cylinder in the form of a level cylinder 50 connected to a submerge cushion accumulator, and FIG. 2c showing a piston 52 and piston rod 54 of the level cylinder (not shown in this figure) attached to the seabed foundation 4 by means of the mooring rope 6 and a quick connector (not shown). Both the pre-tension cylinder 40 and the level cylinder 50 are fluid cylinders, preferably hydraulic cylinders, each with a piston surrounded by the cylinder.

Figure 2D:
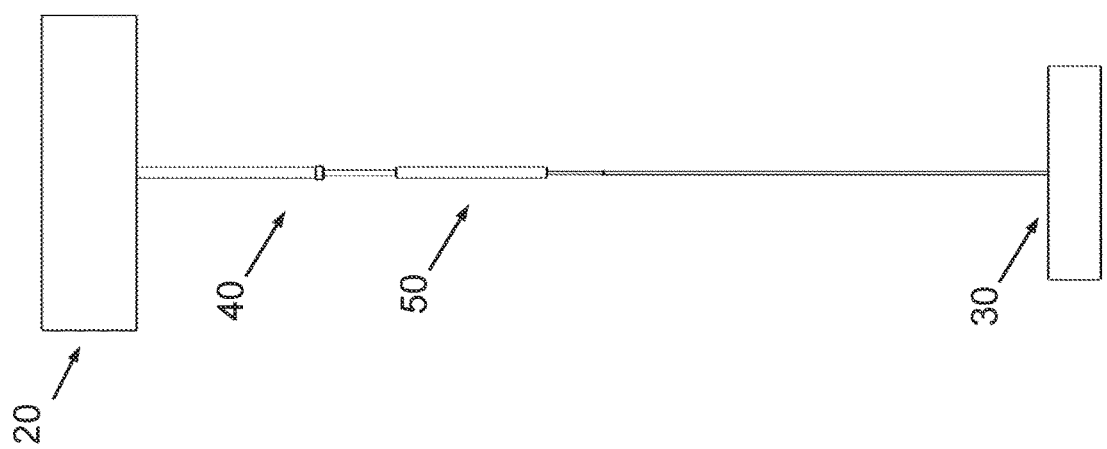

With reference to FIGS. 1*a-c*, the operation of the WEC unit 1 will now be explained in general terms. In FIG. 1*a*, the WEC unit 1 is shown when the buoy 20 is moving upward in a large wave, the direction thereof being shown with a vertical arrow, of the water surface 3, with the pre-tension cylinder 40 in the middle of the available stroke length. In FIG. 1*b*, the buoy 20 has moved further upward with the wave, and the pre-tension cylinder 40 has been extended to the end of the nominal stroke length. The hull 12 of the PTO system 10 has not been displaced at this point. In FIG. 1*c*, the buoy 20 and the PTO system 10 have been equally displaced upwards with the wave, while the buoy 20 has become fully submerged in the wave crest. This mechanism is provided by the first stage end stop cushion increasing the force applied by the pre-tension cylinder 40, whereby the force and pressure in the level cylinder 50, attached between the pre-tension cylinder 40 and the mooring device 4, is also increased. When the pre-charge pressure in a second stage submerge cushion accumulator assembly attached, directly or indirectly, to the level cylinder 50 is exceeded, the level cylinder 50 starts to slide along with the buoy 20, while the force applied by the level cylinder 50 gradually increases as a result of a reduced gas volume in the second stage submerge cushion accumulator assembly, until the motion stops and the buoy 20 is held fully submerged through the wave crest. Further details regarding this two-stage cushioning will be given below:

In order to further explain the two-stage end-stop cushioning system, reference is made to FIGS. 2*d* and 2*e*. In these figures, only the fluid cylinders 40, 50 of the cushioning system are shown. The cushioning system comprises a first fluid cylinder 40, i.e., the pre-tension cylinder, which is adapted to apply, in an end-stop operation, an additional deceleration force on the PTO system 10 above the predetermined maximum control force. The cushioning system also comprises a second fluid cylinder 50, i.e., the level cylinder, adapted to be extended like a spring in an end-stop operation, when the power take-off force is higher than the above said predetermined maximum control force, to hold the buoy 20 submerged through the crests of a large waves. In other words, a second stage end-stop cushioning device comprising the second fluid cylinder 50, having a first end and a second end, is adapted to be extended like a spring in an end-stop operation after the first stage has been activated and when the power take-off force is higher than the above a predetermined maximum control force, to hold the buoy submerged through the crest of a large wave. In one embodiment, shown in FIG. 2*d*, the first cylinder 40 is connected to the buoy 20 while the second cylinder 50 is connected to the mooring device 4. This is the main embodiment which will be described in this description.

In the alternative embodiment shown in FIG. 2*e*, the first cylinder 40 has been turned upside down or flipped as compared with the first embodiment. This means that the piston of the first cylinder 40 is connected to the buoy. The piston is in fixed connection to the buoy 20. This figure shows only the cylinders 40, 50 of the PTO system for the sake of clarity, but it will be appreciated that essentially the entire PTO system is turned upside down as compared to the main embodiment. This also means that instead of being essentially vertically fixed, the PTO system moves with the buoy 20; it is the varying distance between the PTO system and the mooring device 4 that creates the energy. It should be realized that instead of flipping the first fluid cylinder 40, the fluid port can be located in the rod-end of the tube, with the piston rod extending down below the power take-off hull 12, having the second fluid cylinder and the second stage end stop cushioning device attached to it.

Figure 3C:
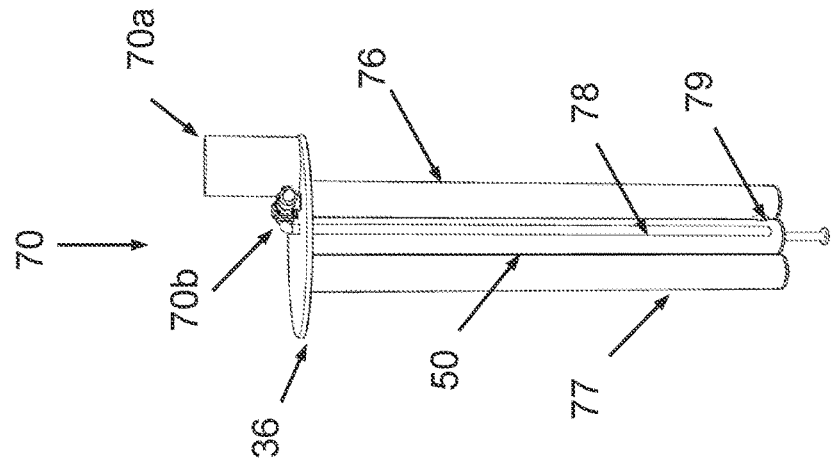
FIG. 3c shows a level system with a submerge end-stop accumulator.
Figure 3B:
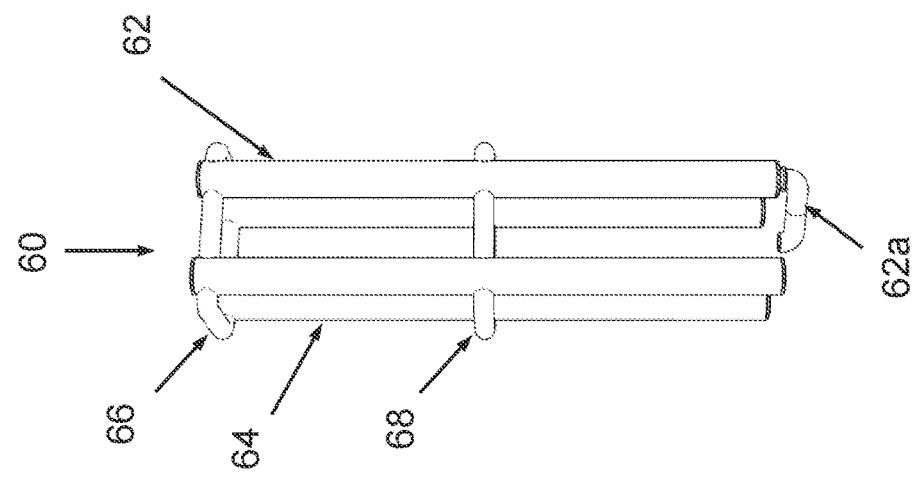
FIG. 3b shows a pre-tension gas accumulator system.
Figure 3A:
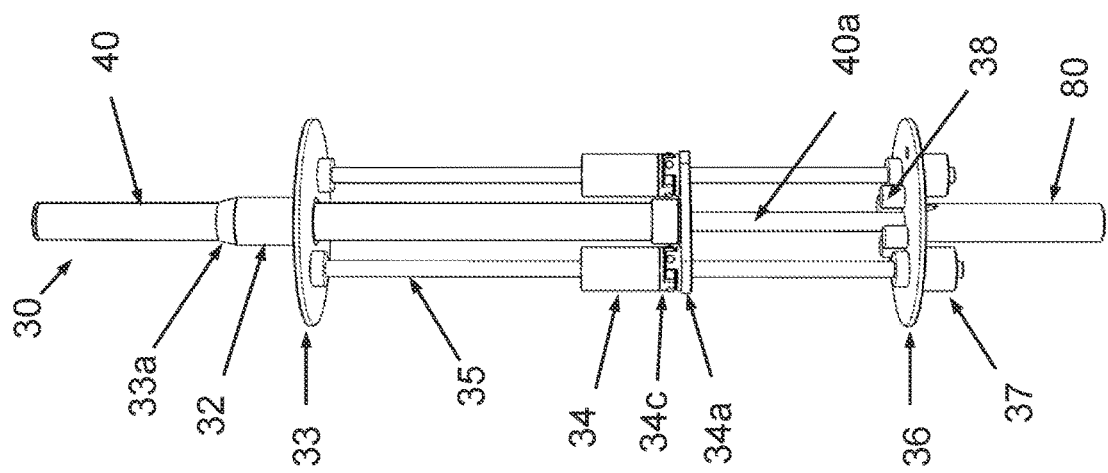
FIG. 3a shows main components of the heave system.
Figure 4D:
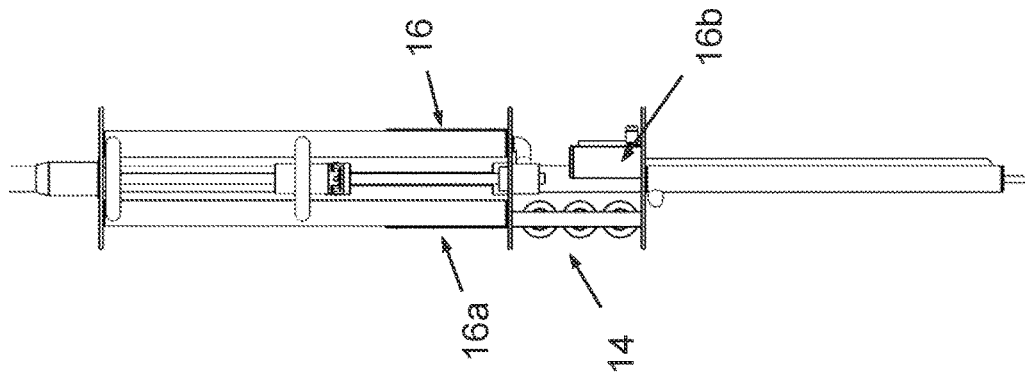
FIGS. 4a, 4b, 4c and 4d show front, left, right and back views of the complete PTO system with power electronics.
Figure 4C:
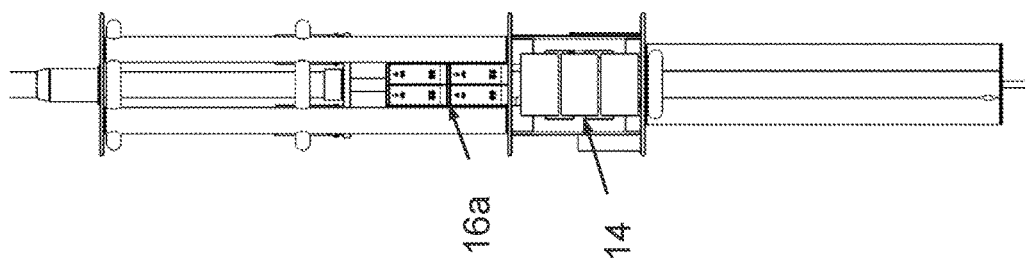
Figure 4B:
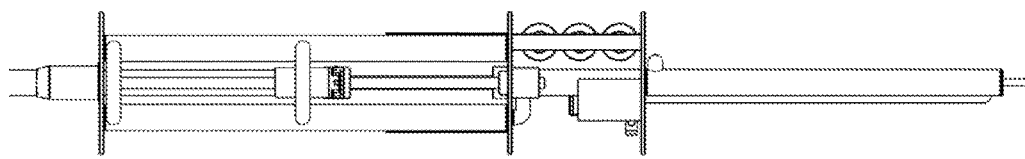
Figure 4A:
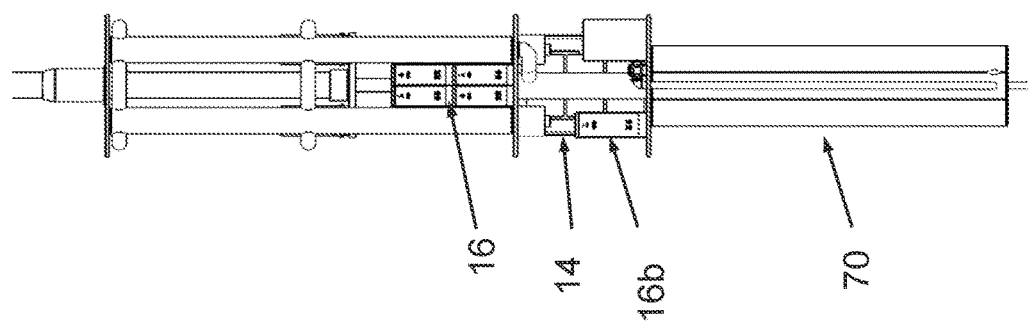

FIG. 3*a* shows the main parts of a heave system 30, preferably providing approximately 5 meter nominal stroke length, comprising a top plate 33 and a bottom plate 36, between which two ball screws 35 extend, preferably in tension. The pre-tension cylinder 40 moves vertically with the buoy 20, with a hollow piston rod 40*a* attached to the heave system bottom plate 36, through which fluid flows to/from a pre-tension cylinder fluid chamber. The pre-tension cylinder 40 is guided in the PTO hull (not shown in this figure) at the heave system top plate 33 by a linear bearing assembly 32, which will be explained in more detail below with reference to FIGS. 9*a* and 9*b*. A cylinder cleaning cap 33*a* and scraper device is located on top of the linear bearing assembly 32 with the purpose of cleaning the top of the pre-tension cylinder 40, to protect the seals and bearing from debrief. Two ball nuts 34 are connected to a ball nut frame 34*a* attached to the lower end of the pre-tension cylinder 40, preferably by means of gimbal joints 34*c*, the ball nuts 34 being arranged to rotate the ball screws 35 as the ball nuts 34 move vertically with the pre-tension cylinder 40. The ball nuts 34 and the ball screws 35 will collectively be referred to as ball screw actuators. Generators in the form of torque motors 37 are connected to the bottom end of the ball screws 35, below the heave system bottom plate 36.

During operation, advanced reactive PTO control force is provided with one passive, nearly constant part, preferably approx. 1 MN, by means of the hydraulic pre-tension spring system of the pre-tension cylinder 40, and with one active part, preferably about 1 MN, by means of preferably the two ball screw actuators comprising the ball nuts 34 and the ball screws 35 with the direct drive torque motors 37 using torque control, which can instantly provide any direction and amplitude of the torque within the design ratings as requested by the control system, resulting in an available PTO control force of 0-2 MN. Advanced efficiency aware reactive control strategies are used to maximize energy output, with constraints on the maximum available active control force, stroke length and velocity. It should be realized that the optimal size and force capacity of the WEC unit 1 can be larger and smaller, depending on e.g., the wave energy resource.

Slack end-stop buffers are provided on the heave system bottom plate 36 around hollow piston rod 40*a* of the pre-tension cylinder, preferably four buffers, functioning as an external cushioning system 38 for the downward movement of the pre-tension cylinder 40. It should be realized that the external cushioning system can also be implemented as a hydraulic cushion inside the pre-tension cylinder 40, similar to the submerge end-stop cushion to be described below.

The deceleration force and length of the external cushioning system 38 is lower compared to the submerge end-stop buffers, due to the much lower weight of the pre-tension cylinder 40 and ball nut assembly 34 according to FIG. 3*a*, preferably approx. 4-5 ton, compared to the main part of the PTO system according to FIG. 2*b*, preferably approx. 55-65 ton. The slack end-stop buffers 38 preferably having a length of 50 mm, preferably with 1.2 MN average deceleration force.

When the buoy 20 continues to move down after the slack end-stop provided by the external cushioning system 38, the link rope 22 between the buoy 20 and pre-tension cylinder 40 will slack. When the buoy 20 moves up again, the link rope 22 will get tensed, and a snap load will occur when the pre-tension cylinder 40 and ball nut assembly 34 is accelerated quickly. However, snap loads can be handled without significant oversizing of the link rope 22 and connectors, due to the low inertia of the mentioned part of the system.

FIG. 3b shows a pre-tension gas accumulator assembly 60 with one or more piston accumulators 62, preferably one piston accumulator, and one or more gas accumulators 64, preferably three gas accumulators in the form of vertical pipes, whereby the piston accumulator 62 is connected to the pre-tension cylinder hollow piston rod 40a through a fluid connection pipe 62a. The pre-tension gas accumulator assembly 60 has a fluid/volume ratio of between 1:5 and 1:10, more preferably between 1:6 and 1:8, and most preferably about 1:7, to provide small variation in pressure and the corresponding force, preferably approx. 1 MN, applied by the pre-tension cylinder across the length of stroke. All accumulator pipes are connected with gas connection pipes 66 at the top and are preferably also supported in the middle by a support frame 68.

A further purpose of the vertical gas accumulator pipes 62, 64 is to resist compressive force in the system that occurs from the bi-directional force of the ball screws 35, preferably approx. 1 MN, and also from the hydrostatic pressure acting on the PTO hull 12, so that compressive loads in the ball screws and the hull is limited to an extent that buckling issues are avoided.

FIG. 3c shows the complete level system 70, with the level cylinder and submerge cushion accumulator assembly attached to the bottom plate of the PTO hull. The level cylinder 50 is located in the center, a piston accumulator 76 is located on one side and a gas accumulator 77 on the other side, a fluid pipe 78 connects fluid ports 79 at the bottom of the level cylinder 50 and the bottom of the piston accumulator 76. A gas pipe (not shown in this figure) connects the gas ports at the top of the piston accumulator 76 with the top of the gas accumulator 77. The level cylinder and submerge cushion accumulator assembly is detachable from the PTO bottom plate, and with an oil pump 70b and an oil reservoir 70a located above the PTO bottom plate, thereby being a part of the main PTO assembly.

FIGS. 4a-d show the PTO system 10 according to FIGS. 3a-c, with preferred locations for a transformer 14, torque motor AC/DC drives 16, DC/AC inverters 16a and control cabinet 16b. It should be realized that power electronics, control system and auxiliary systems can be fitted in different locations.

It should also be realized that medium voltage motors can be used in which case the transformer is not needed, whereby the height of the intermediate section between the heave system and the level system, and thereby the overall length of the PTO system, can be reduced.

Figure 5B:
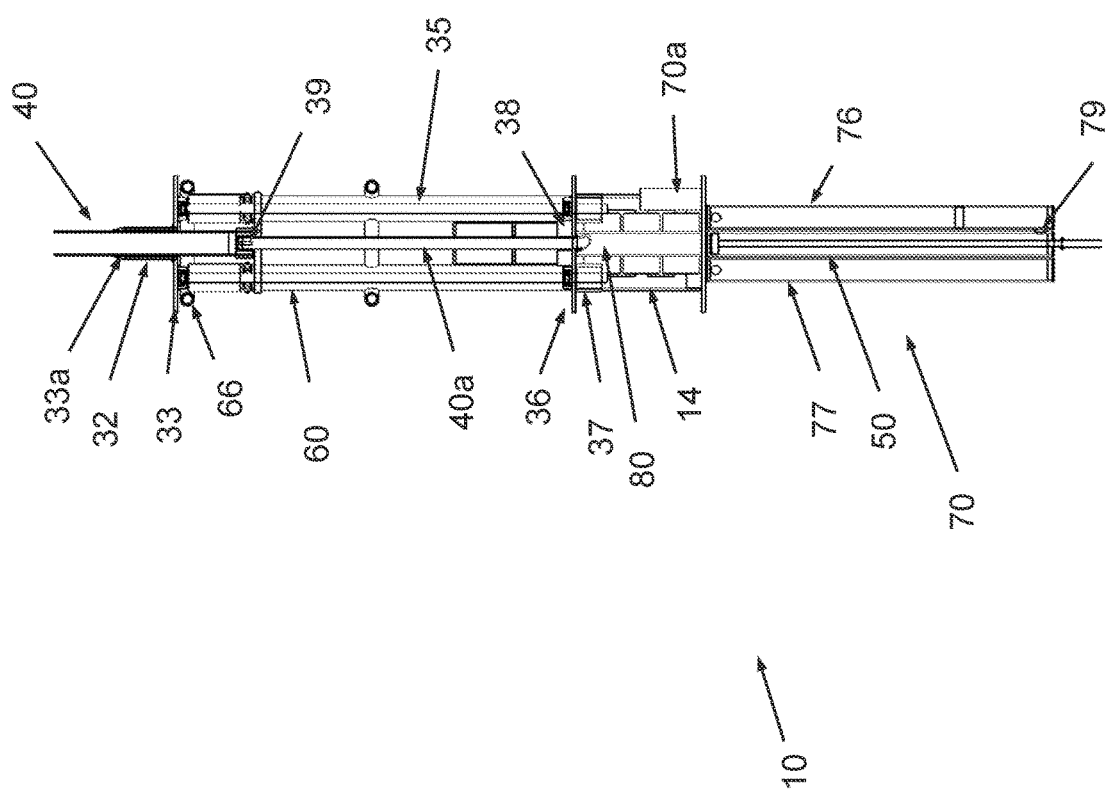
FIG. 5b shows a cross-sectional view of the complete PTO system.

FIG. 5a shows a schematic view of the main parts of the WEC unit 1, comprising the buoy 20, the main PTO system 10 with a pre-tension cylinder 40, gas accumulator and ball screw actuators, the level cylinder 50 and submerge cushion accumulator assembly, with the level cylinder 50 being actuated by a level pump to adjust the height of the PTO system 10 above the seabed, and a seabed foundation 4, which are further described here below:

FIG. 5b shows a cross sectional view of the PTO system 10 according to FIGS. 4a-d. The heave system comprises the pre-tension cylinder and ball nut assembly 40, 34 moving with the buoy, and all other parts having an essentially fixed vertical position against the heave motion. When assembled, the pre-tension cylinder end cap 33a is preferably mounted with the cylinder fully retracted, i.e., piston in the top end of the cylinder. Vacuum is created when the piston rod extends, whereby the passive chamber in the pre-tension cylinder does not have to be connected to an external oil reservoir.

The part of the main heave system held in a vertically essentially fixed position against the heave motion, comprises the ball screws 35 and the pre-tension gas accumulator assembly 60 between the heave system top and bottom plates 33, 36. The ball screws 35 are attached to the heave system top and bottom plates 33, 36 with thrust bearings to allow rotation. The bottom ends of the ball screws 35 are preferably connected to the frameless torque motors 37, the rotors of which are mounted on the bottom end of each ball screw 35 and stator to the heave bottom plate 36, and with the ball screws 35 arranged to rotate in the opposite direction of each other by one having left oriented grooves and the other having right oriented grooves, when the ball nuts 34 move vertically along the ball screws 35, with the purpose of canceling the torque between the two ball screw actuators. Any type of framed electric generator/motor can also be used and connected to the ball screws 35 with shaft couplings. The vertically fixed part of the PTO system 10 furthermore comprises the hollow piston rod 40a of the pre-tension cylinder being attached to the heave system bottom plate 36, power electronics and other auxiliary systems, the pre-tension cylinder cleaning cap 33a and linear bearing assembly 32 at the top of the heave top plate 33, and finally the level system 70 at the bottom of the PTO system 10.

The level system 70 is connected to the heave system 30, in the shown embodiment by means of a link pipe 80, the link pipe preferably being approximately 2 meter long, to give room for transformer 14, oil reservoir 70a and oil pump to the level system 70 and other auxiliaries. In an alternative embodiment, with the transformer 14 in the center, preferably four stays are arranged around the transformer 14 to connect the heave and level systems. The level system 70 comprises a hydraulic cylinder, preferably having a total length of less than 6 meter (20 feet), with a fluid port 79 at the bottom to exchange fluid with the piston accumulator 76. The piston accumulator 76 is connected to the gas accumulator 77 through a gas connection pipe at the top. The level cylinder end cap is mounted with the piston rod 40a fully retracted, whereby vacuum is created when the piston rod 40a extends from the cylinder 40, thereby there is no need to have a fluid port and reservoir for the passive chamber of the level cylinder. A submerge end-stop 39 is also provided, see below.

Figure 6:
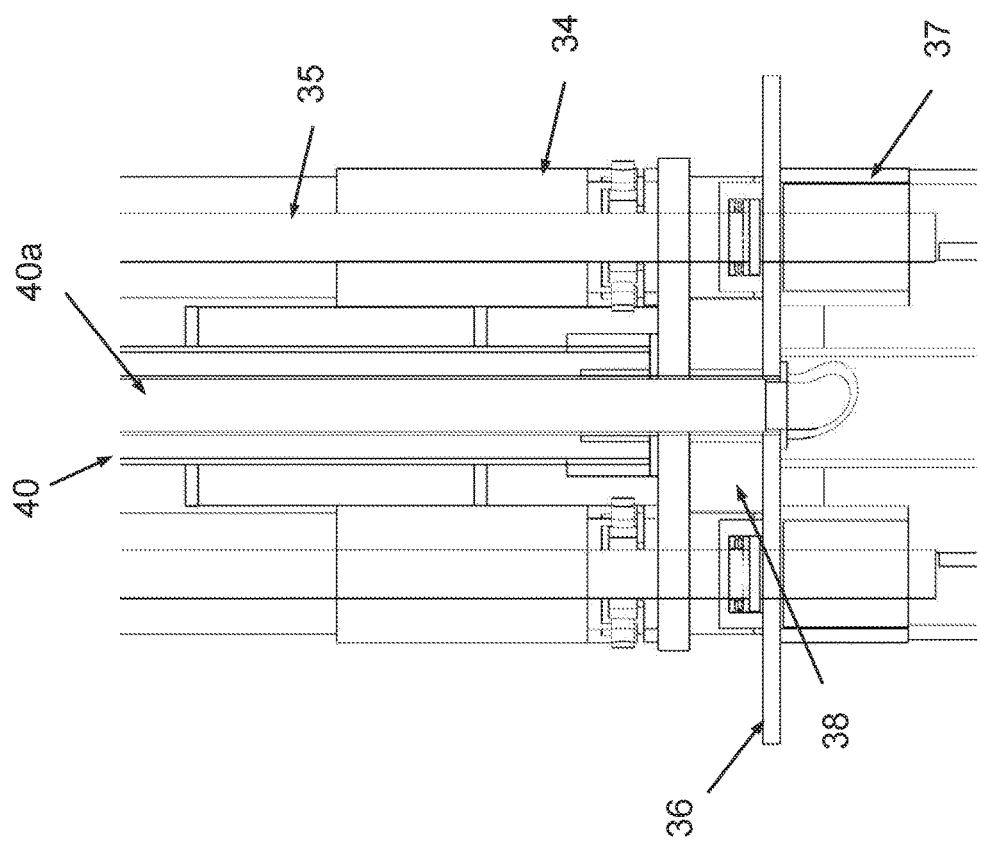
FIG. 6 shows a cross-sectional view of the bottom part of the heave system of FIG. 3a with slack end-stop buffers.

FIG. 6 shows a close-up cross-sectional view of part of the heave system 30 according to FIG. 5b, with the bottom of the pre-tension cylinder 40 and ball nut assembly 34 in slack end-stop position, resting on top of the slack end-stop buffers 38. The slack end-stop buffers 38 have the purpose of decelerating and stopping the relative motion between the pre-tension cylinder 40 and the hollow piston rod 40a before the pre-tension cylinder 40 is fully retracted. The buffers are preferably impact buffers, such as Polyurethane-Elastomer buffers, also called Diepocell, or hydraulic buffers, mounted on top of the heave bottom plate 36, but can also be integrated as a hydraulic cushion system inside the pre-tension cylinder.

In a preferred embodiment, impact buffers in a similar arrangement are also used in the submerge end-stop, between the top heave plate and the ball nut assembly.

Figure 7:
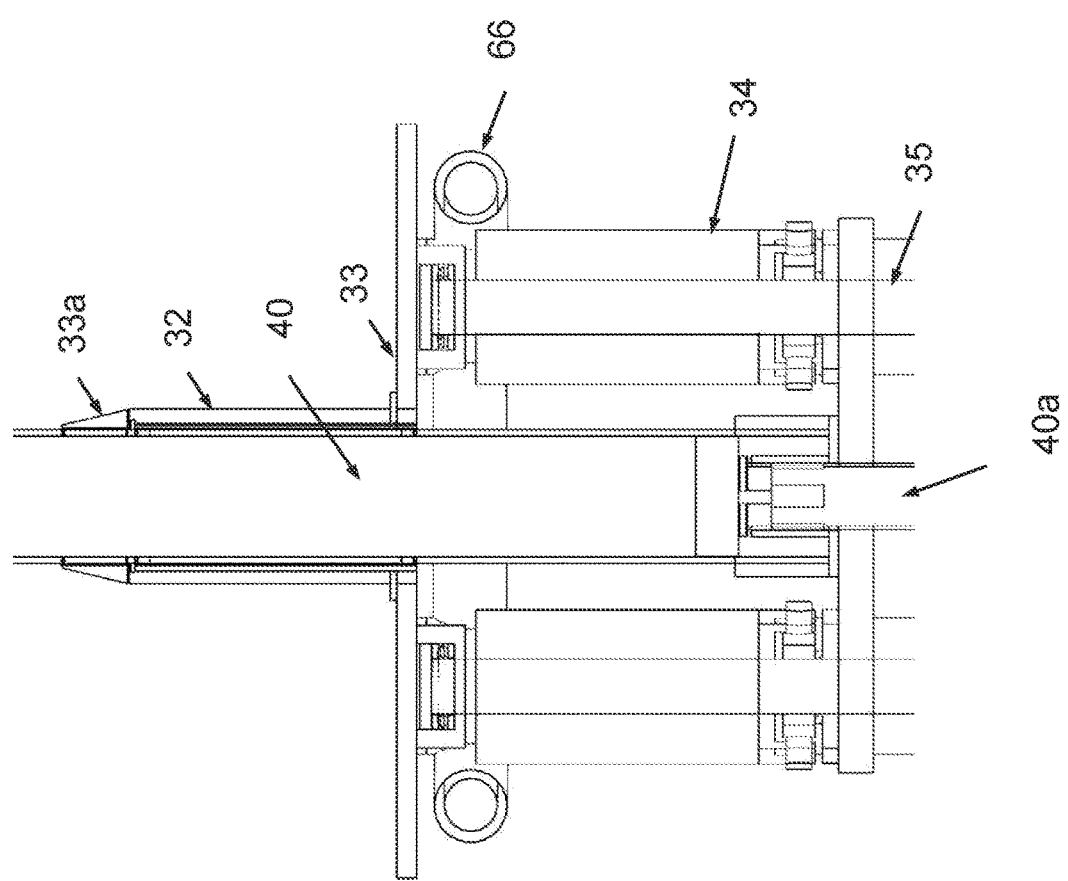
FIG. 7 shows a cross-sectional view of the top part of the heave system of FIG. 3a, with a hydraulic submerge end-stop cushion in the pre-tension cylinder in hard end-stop position.

FIG. 7 shows a close-up cross-sectional view of the top part of the heave system according to FIG. 5b, with the pre-tension cylinder 40 in hard end-stop position.

Figure 8B:
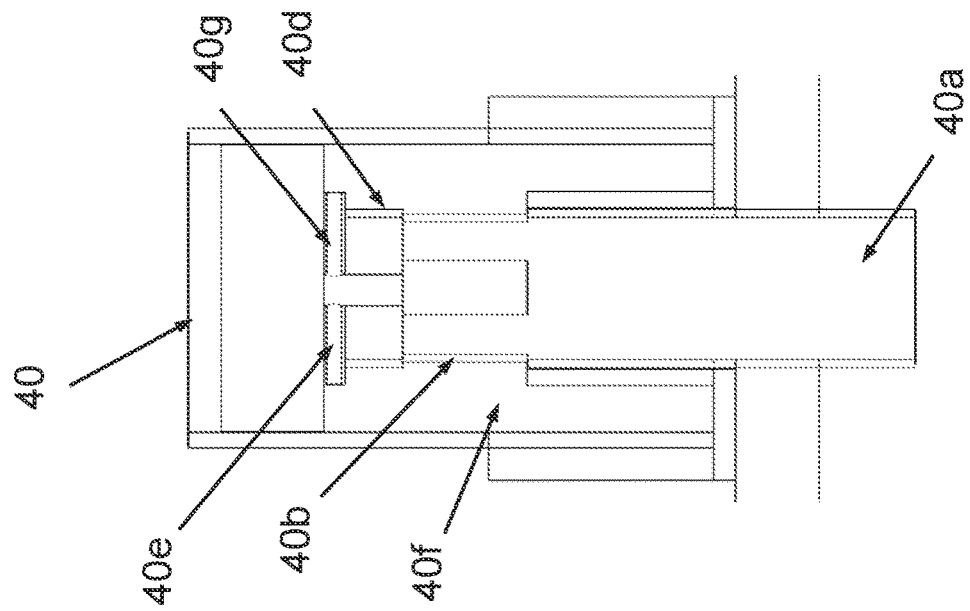
FIGS. 8a and 8b show cross-sectional views of the submerge end-stop cushion and slot openings in the hollow piston rod to the fluid chamber of the pre-tension cylinder.
Figure 8A:
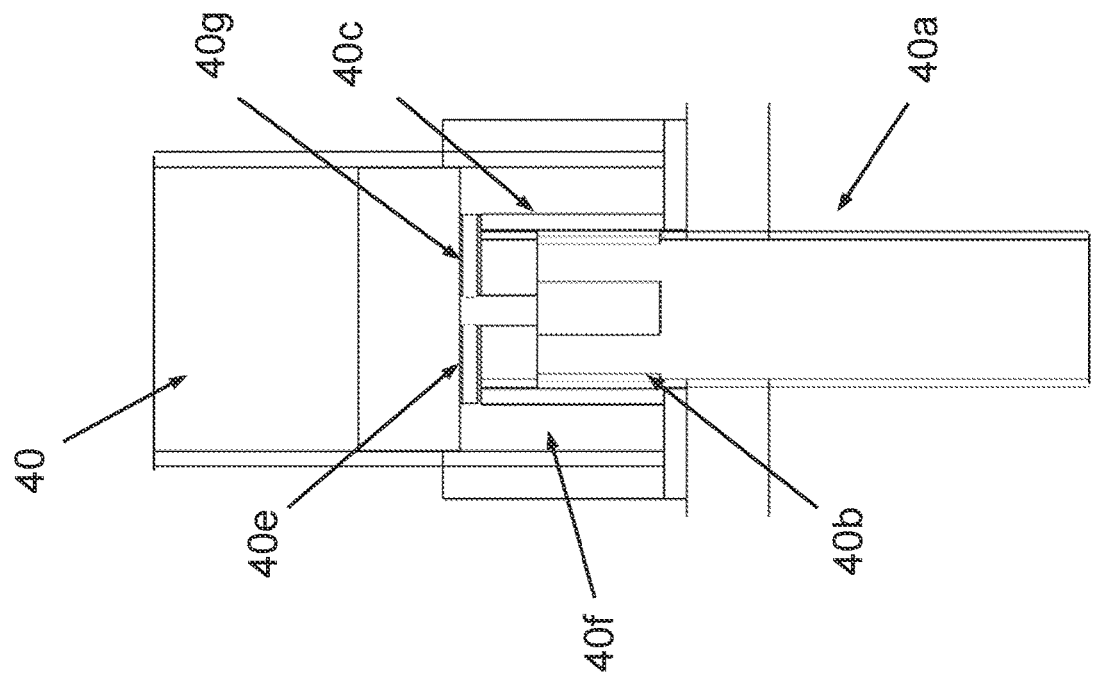

FIGS. 8a-b show close-up cross-sectional views of the submerge end-stop 39 according to FIG. 5b. The hollow piston rod 40a exhibits fluid ports, preferably in the form of slots 40b in the upper end portion thereof. A submerge cushion cavity is provided which is defined by a cylinder 40c extending upward from the bottom end of the pre-tension cylinder 40. The cylinder completely covers the slots 40b when the pre-tension cylinder 40 is in its hard end-stop position shown in FIG. 8a. FIG. 8b shows a position with the slots 40b at the upper end portion of the hollow piston rod 40a being fully open, having the top of the submerge cushion cavity aligned with the bottom of the slots. When the pre-tension cylinder 40 extends further out of the PTO hull, i.e., when the pre-tension cylinder 40 moves from the position in FIG. 8b towards the one of FIG. 8a, the slots 40b are gradually closed, whereby the pressure drop starts to build up depending on the velocity. When the slots 40b are fully closed, a cushion sleeve 40d enters into the cavity, allowing preferably 100 mm further movement of the pre-tension cylinder 40 with the fluid being forced from the fluid chamber of the pre-tension cylinder through an over pressure relief valve canal 40e, and further down into the vertical canal in the top of the hollow piston rod 40b. By means of the over pressure relief valve 40e, the pressure in the pre-tension cylinder chamber 40f is increased, preferably from 240 bar to 600 bar, thereby providing a high and constant end-stop breaking force to decelerate and stop the relative motion between the pre-tension cylinder and piston.

The ball screw actuators 34, 35 are preferably used to assist the first stage submerge end-stop cushion by applying, preferably maximum available braking force, when the pre-tension cylinder 40 gets close to the end-stop cushion 39, preferably 100 mm before the fluid port is closed and the cushion sleeve enters the submerge cushion cavity. The use of active ball screw assistance greatly reduces the number of times the cushion sleave moves into the cavity, which improves the lifetime of the pre-tension cylinder cushion.

The increased force in the pre-tension cylinder 40 due to the first stage submerge end-stop cushion 39 results in an increased force and pressure also in the level cylinder 50, arranged between the pre-tension cylinder 40 and the mooring 4. When the force and corresponding pressure in the level cylinder 50 exceeds the pre-charge pressure in the second stage submerge end-stop accumulator, the accumulator is charged with fluid, whereby the pressure and corresponding force increases gradually while the PTO hull and level cylinder 50 slides along with the motion of the buoy 20, with the pre-tension cylinder 40 being locked to the PTO system 10 by means of the first stage in the submerge end-stop cushion. This two stage end-stop cushion enables a short length of the heave system 30, being the more complex and expensive part of the system exposed to very high number of load cycles and long travel distance, while allowing a relatively long deceleration distance to be provided through the level cylinder 50 exposed to much lower number of load cycles and shorter travel distance, thereby requiring much less force to stop the buoy motion.

To achieve high energy output and at the same time low cost, the maximum tether force required to hold the buoy of the WEC unit 1 fully submerged through large waves is preferably approximately twice the maximum PTO control force, which is the sum of the pre-tension force and the ball screw forces. The maximum end-stop force required with the two stage submerge end-stop system is preferably approximately 4 MN while the maximum PTO control force is preferably approximately 2 MN.

When the wave descends after a submerge event and the buoy 20 surfaces and starts moving down with the wave, the second stage submerge end-stop accumulator discharges all fluid, whereby the piston lands in the hard end-stop position of the piston accumulator, preferably having an elastic material such as an elastomeric spring or a hydraulic cushion, and the level cylinder 50 slides back into the previous position, whereafter the pre-tension cylinder 40 starts to retract into the PTO hull 12, whereby the sleeve exits from the cavity while fluid flows back into the pre-tension cylinder fluid chamber 40f by means of a check valve 40g, whereby the fluid chamber is again pressurized by the pre-tension gas accumulator system. The system returns into normal heave operation as soon as the fluid port is open.

In summary, the additional force required to hold the buoy 20 submerged through the crest of large waves is provided through the two stage end-stop cushioning system. The first stage is preferably a standard cushion in the pre-tension cylinder 40, preferably 100 mm long. The second stage is a hydraulic accumulator connected to the level cylinder 50, preferably with a pre-charge pressure corresponding to slightly higher force than the maximum PTO control force, so that the accumulator starts charging with fluid as a result of the increased force from the first stage end-stop cushion in the pre-tension cylinder, whereby the level system can slide up to a maximum distance, which preferably is 1-2 meter, while the force increases gradually with the reducing volume of the gas accumulator, until the buoy motion stops and the position is held with the buoy fully submerged through the crests of large waves.

The pre-tension cylinder 40 applies the pre-tension force while the buoy 20 moves down with the wave until the slack end-stop buffers are reached and the motion of the pre-tension cylinder 40 stops again at the other end of stroke.

Figure 9A:
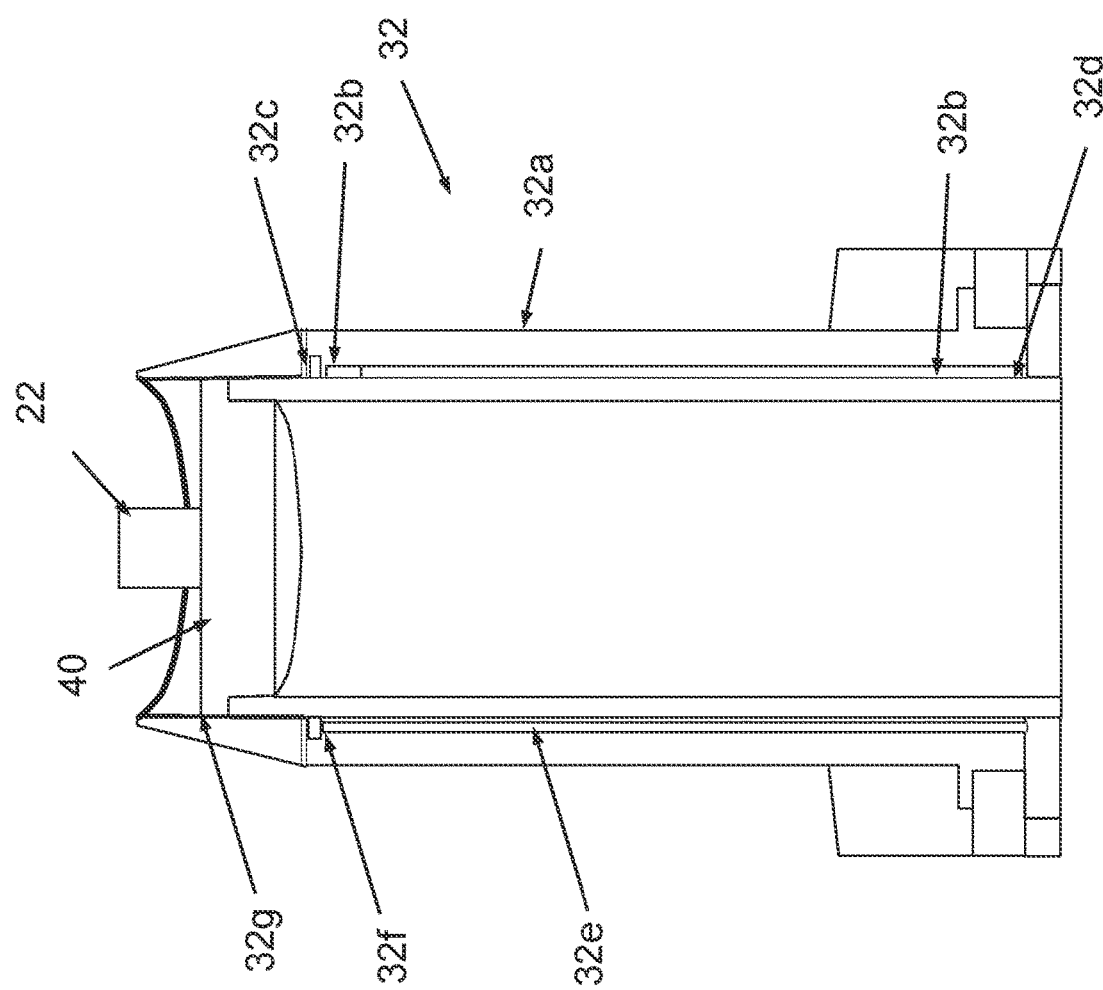
FIG. 9a shows a cross-sectional view of the linear bearing and cleaning cap assemblies for the pre-tension cylinder.

FIG. 9a shows a cross-sectional view of the linear bearing assembly 32 and cleaning cap assembly 33b, wherein the linear bearing assembly 32 comprises a support cylinder 32a with one seal 32c at the top and one seal 32d at the bottom, and linear bearings 32b behind each seal 32c, 32d inside the support cylinder 32a, with the purpose to resist out of axis loads when the link rope 22 and buoy are not axially aligned with the PTO system 10. The gap between the pre-tension cylinder 40 and the support cylinder 32a is filled with oil and preferably connected to a diaphragm accumulator to pressurize the oil, preferably with a higher pressure than the pressure inside the PTO hull 12 and the pressure of the sea water outside of the PTO hull 12, with the purpose of making the seal system more effective to prevent sea water and gas to pass the seal, and to lower the friction with oil lubrication. The accumulator is preferably connected to a vertical canal 32e drilled from the bottom of the support cylinder and stopping below a water chamber 32f below a jet nozzle 32g. Horizontal canals are preferably drilled between the vertical oil canal and the gaps between each seal and linear bearing, and between the linear bearings. Alternatively, the linear bearings have a groove on the back side, or the support cylinder have a vertical groove on the inside, to allow oil to move across the linear bearings and fill the entire gap between the seals, whereby the vertical canal can be much shorter and only one horizontal canal above or below the bottom linear bearing is required. Alternatively, the gap is connected to the accumulator through a piping system on the outside of the support cylinder, connected to horizontal canals into the gap.

The water chamber at the top of the linear bearing assembly is connected by means of a vertical canal through the support cylinder to a pump and filter inside the PTO hull, not shown, which pumps sea water into a filter to clean it from particles, and then into the water chamber, from which water flows out through the jet nozzle, a small gap around the pre-tension cylinder, with the purpose to prevent sand and particles to fall down on top of the linear bearing and seal and cause damage. Instead of a vertical canal drilled through the support cylinder, the filtered water can be pumped to the water chamber by means of a pipe system outside of the support cylinder, connected to a horizontal canal into the water chamber.

Figure 9B:
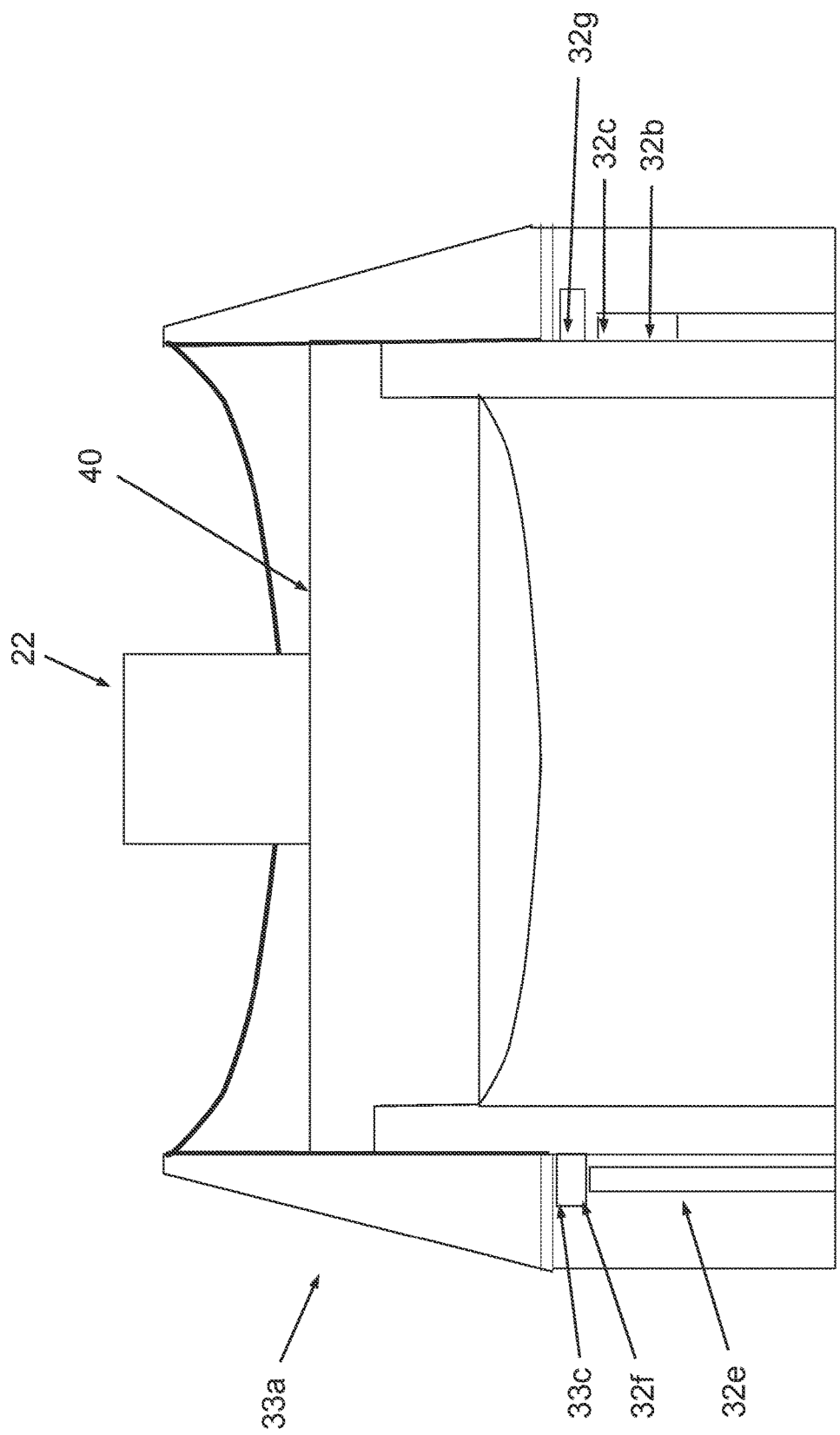

FIG. 9b shows a cross-sectional view of the cylinder cleaning cap assembly according to FIG. 5b, a cone mounted with a small gap 33c on top of the jet nozzle, allowing exhaust water from the jet nozzle 32g to flow out horizontally, the cone having preferably lamella gaskets/bushings or brushes at the top and bottom that clean the pre-tension cylinder from sea growth and prevent hard substances such as barnacles from growing, when the cylinder moves up and down through the top cone, to keep the top of the pre-tension cylinder clean, since the velocity of the cylinder motion when it reaches the submerge end-stop cushion is mostly low and will not result in high enough force to open the over-pressure relief valve, thus stopping the cylinder before entering the submerge end-stop cushion. For this reason, the top of the pre-tension cylinder is slightly above the lower lamella bushing in the cleaning cap in the hard end-stop position, and the distance between the lower and upper lamella bushings is larger than the length of the pre-tension cylinder submerge end-stop cushion, whereby the top of the pre-tension cylinder will pass the upper lamella gasket before the pre-tension cylinder enters the submerge cushion.

Figure 10:
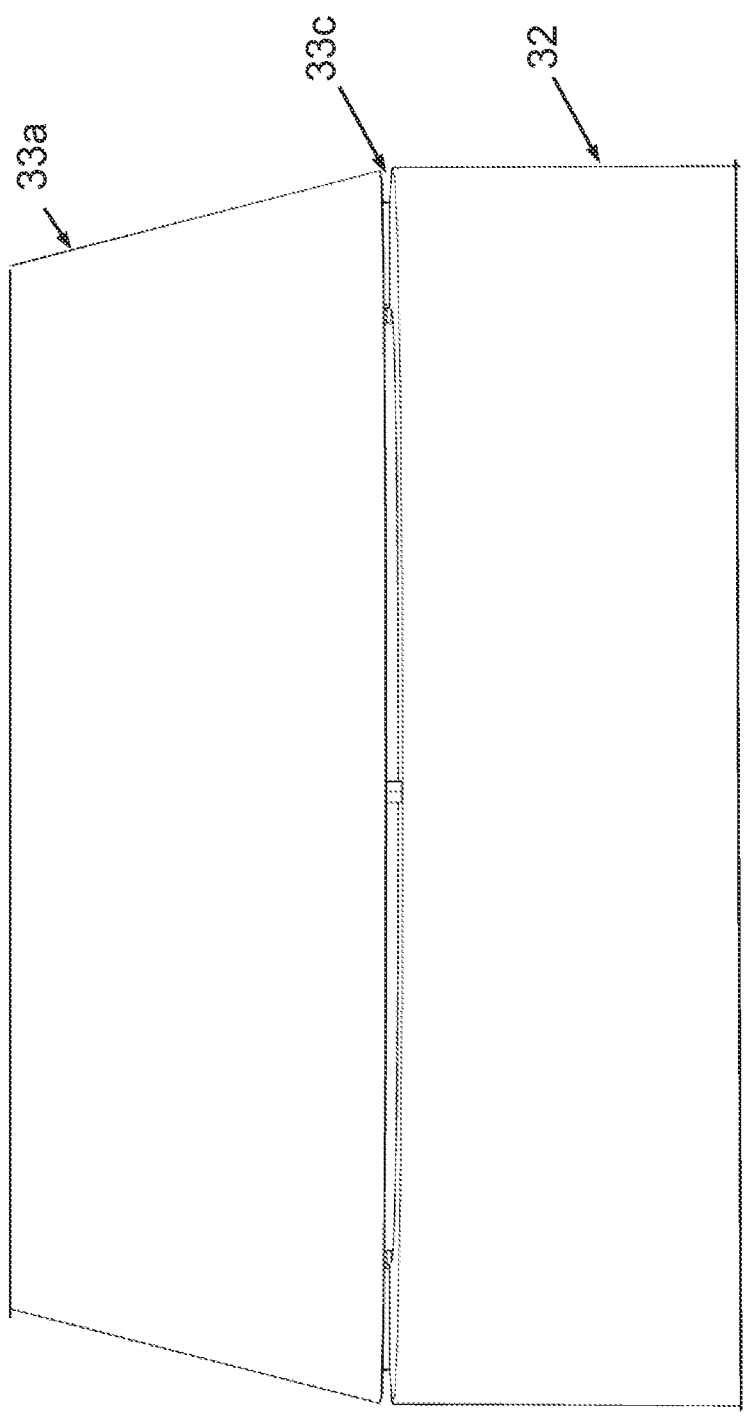
FIG. 10 shows a cleaning cap on top of the linear bearing assembly.

FIG. 10 shows a close-up view of the cylinder cleaning cap 33b according to FIG. 9b from the outside, illustrating the horizontal gap between the top cleaning cone and the water chamber and jet nozzle on top of the linear bearing.

Figure 11:
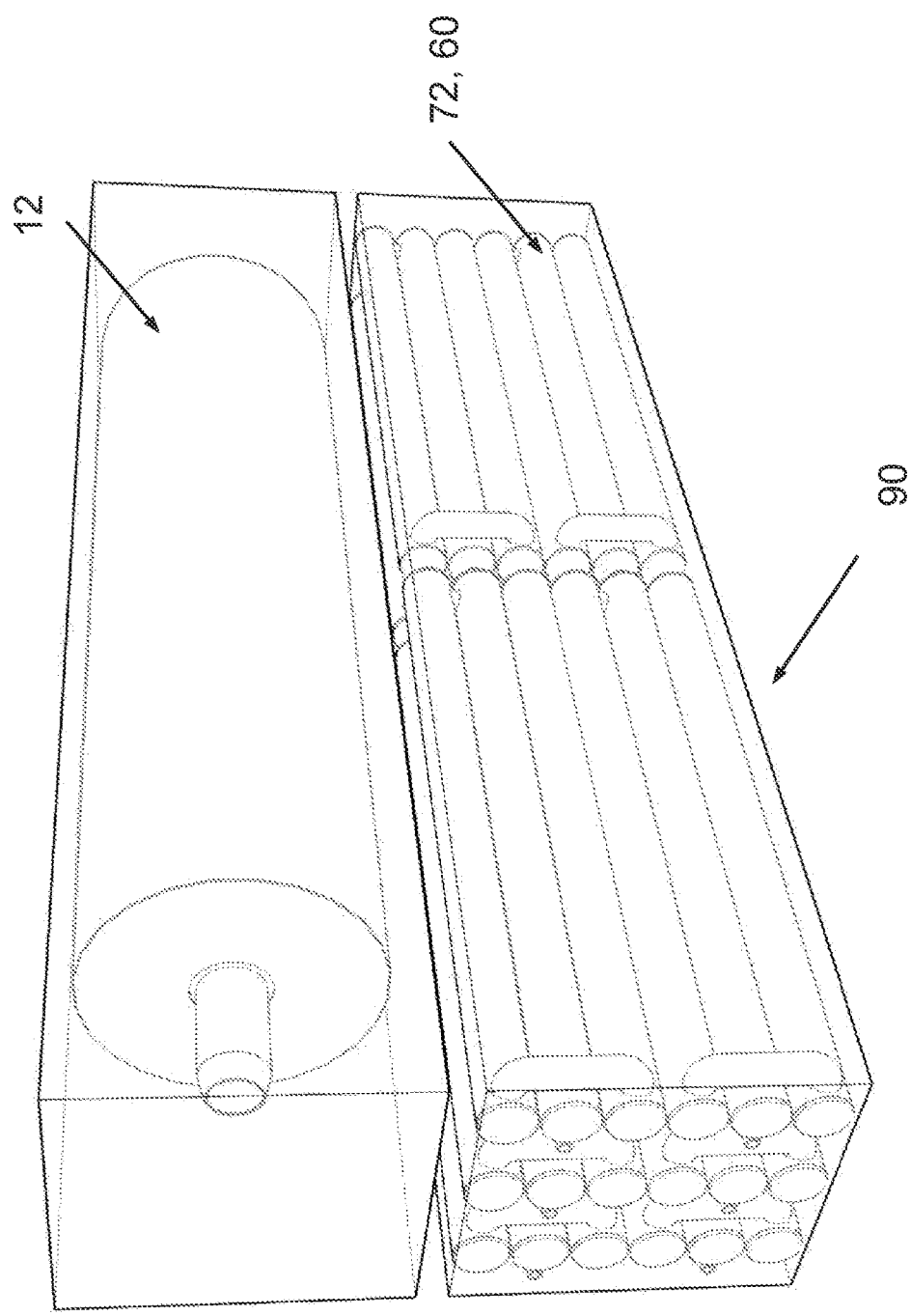
FIG. 11 shows a view of the main PTO system in a first 40 foot container, and 12 level cylinder and submerge cushion accumulator assemblies in a second 40 foot container.

FIG. 11 shows the main PTO system 10, i.e., the PTO hull 12 including the components provided therein, fitted within the dimensions of a standard 40-foot container 90, and twelve level cylinders 72 and accumulator assemblies 60 fitted within the dimensions of a standard 40 foot container, each assembly having a length less than 20 feet. The purpose of making the PTO system 10 modular is to fit the two parts within the dimensions of a standard 40-foot container 90, which enables road transportation to the installation site, from any location for manufacturing and assembly of the PTO system 10.

It should be realized that in some locations, with high tidal variation, the level system may have to be extended, in which case only 6 or fewer level systems would fit within the dimensions of a standard container. It should also be realized that there is a limit of the maximum allowed weight for handling and shipment, which limits the maximum number of level cylinders 72 and accumulator assemblies 60 that can be transported in a single container 90. The main PTO system 10 and level systems 70 may be transported inside containers, or in an open structure having the same exterior size as a standard container.

It should be realized that the PTO system 10 can be disassembled in a different way, where the PTO hull 12 and level cylinder 50 and submerge accumulator assembly is shipped in one container and the main PTO system 10 is shipped in another container, with the purpose of lowering the weight for the container shipment with the main PTO system 10.

Installation is preferably done by first mounting the level cylinder 72 and submerge cushion accumulator assembly 60 to the bottom of the main PTO system 10 on the harbor docks. A docks crane is then used to deploy the PTO system 10 into the water next to a tugboat. Before releasing the PTO system 10 from the crane, the bottom end of the mooring rope, and the dynamic power cable is secured to the PTO or the tugboat, whereby the PTO system will float in a horizontal position.

The link rope 22 is extended with a guide rope (not shown in the figures) that is pulled through the center of the buoy 20, whereafter the buoy 20 is deployed in the water. The guide rope is pulled up through the center of the buoy 20 until the spliced loop top end of the link rope is aligned with the chackle on top of the buoy, where it is secured with the sprint. The PTO system 10 and buoy 20 are then tugged to the installation site.

In case of using a large installation vessel, the same procedure can be done from the deck of the installation vessel, having the parts of multiple wave energy converters on board, which can all be deployed before the installation vessel returns to load more systems.

The procedure to connect the link rope 22 from the PTO system 10 to the buoy 20 can also be performed offshore at the installation site, preferably with only the guide rope in place, to pull the link rope through the buoy.

On the installation site, the power cable, extending from the bottom of the main PTO hull 12, is first connected to a floating substation, whereafter the control system in the PTO system 10 can be operated with power from the electrical wave farm infrastructure, preferably from an energy storage system connected to the wave farm infrastructure. In case there is no power available in the sub-station, the dynamic cable can be connected to a power unit on board the tugboat, providing the necessary power for the installation procedure.

The buoy 20 and the PTO system 10 are then placed above the pre-installed seabed foundation 4. The PTO system 10 is designed to be slightly positively buoyant with the mooring connector excluded, and slightly negatively buoyant with the mooring connector included. This makes it possible to use a winch from the tugboat attached to the mooring connector and lower the PTO system 10 and mooring rope 6 until the assembly takes a vertical position above the seabed foundation.

Before the PTO hull 12 is lowered to its vertical position, gas, such as nitrogen, is preferably released from the pre-tension accumulator system, which has been charged to maximum pressure. The gas released to pressurize the PTO hull 12, preferably to 4-5 bar, with the purpose to avoid compressive loads on the PTO hull from the surrounding water when large waves roll over the PTO system 10 and the water height above can reach approximately 30-40 meter. This way the wall thickness of the hull can be made thinner and lighter. Using the pre-tension system gas accumulator to pressurize the PTO hull 12 can be done without adding any additional accumulators to the system, since the pre-tension system will preferably operate in a range from 190-240 bar, having the highest pressure with the pre-tension cylinder fully extended. The pressure of the pre-tension gas accumulator is thereafter lowered to approximately 190 bar by releasing gas into the PTO hull, before the pre-tension cylinder is extended.

The tugboat now connects to the buoy instead, to position it straight above the seabed foundation. The PTO control system is started, and the heave system is extended, preferably to 50%, after which a heave compensation function is enabled by means of the ball screw actuators, to maintain a steady vertical position of the PTO house. The level system pump is now used to extend the level cylinder and lower the mooring rope connector into the seabed foundation connector, where it is preferably locked with an ROV that is used for supervising the installation and showing a video feed of the connection procedure, to assist the positioning of the mooring rope connector into the seabed foundation connector.

In case a large installation vessel is used, the PTO system 10 is preferably attached to the seabed foundation before the buoy is attached to the link rope. This way the power take-off system does not have to be commissioned to assist the connection to the sea floor foundation. The PTO system 10 is instead positioned with a crane and winch on the installation vessel, preferably with heave compensation to enable installation in larger waves. Preferably multiple PTO systems 10 are first deployed and attached to its sea bed foundation 4, after which the power cables are attached to the sub-station and finally the buoys 20 are deployed and connected to the link rope. The buoy for each wave energy converter is deployed with a crane from the same or a separate installation vessel as used for the PTO systems 10, or towed to site with tug boats, each buoy having a guide rope through the center hole, which is used to pull the link rope in place ones the buoy is in the water, with the heave and level systems in sufficiently extended position to prevent tension in the link rope, whereby the end of the link rope is easy to position for the locking mechanism of the shackle or quick connector.

To retrieve a WEC unit 1 for maintenance, the process is reversed. Maintenance of the PTO system 10 is preferably done onshore.

A wave energy converter (WEC) unit 1 with a modular power take-off (PTO) system 10 comprising a heave system 30 with two ball screw actuators and a hydraulic pre-tension system and gas accumulator with the first stage of a submerge end-stop cushion, and a level system and a submerge end-stop accumulator with a second stage of the submerge end-stop cushion, has been shown and described. It will be realized that the PTO system 10 can be implemented with a different number of ball screws and accumulator pipes than the number defined by the appended claims. For example, any number between two and four ball screw actuators with two to eight accumulator cylinders can be used.

A power take-off system 10 used in a WEC unit 1 wherein the power take-off hull is essentially vertically fixed against wave motion has been described. In an alternative embodiment, the main heave system is oriented in the opposite vertical direction, with the link pipe or equivalent connected with the link rope to the buoy, and the pre-tension cylinder connected with the level system, whereby the PTO hull 12 moves together with the buoy and the pre-tension cylinder is in an essentially fixed vertical position. In a second similar embodiment, the main PTO system 10 and hull 12 is integrated with the buoy 20, in which case the link rope is not present.

In this case the two-stage end-stop cushioning system comprises a first stage end-stop cushioning system adapted to dampen the movement between the mooring device and the power take-off device up to a predetermined force, and a second stage end-stop cushioning system adapted to allow an extension of the distance between the buoy and the power take-off device above said predetermined force. In other words, the two-stage end-stop cushioning system is "turned upside down" as compared to the system described above with reference to the figures.

It should be realized that the two-stage end stop cushion system comprising the pre-tension cylinder, level cylinder and their respective hydraulic accumulators, can be combined with any type of suitable linear actuators in addition to ball screws, having the purpose of extracting power from the system, such as rack and pinion, winch, any type of power screw, magnetic screw, linear electromagnetic actuator, linear generator, hydraulic cylinder connected to a hydraulic motor and generator, or water pump, preferably connected to a pelton turbine, preferably on a separate floating platform or on the shore.

Certain embodiments or components or features of components have been noted herein as being "preferred" and some options as being "preferable" or the like and such indications are to be understood as relating to a preference of the applicant at the time this application was filed. Such embodiments, components or features noted as being "preferred" or "preferable" or the like are optional and are not required for implementation of the innovations disclosed herein unless otherwise indicated as being required, or specifically included within the claims that follow.

The invention claimed is:

1. A power take-off device for use in a wave energy converter unit having a buoy, the power take-off device comprising:
    a power take-off hull connectable to a mooring device,
    the power take-off device being connected to or connectable to the buoy,
    a power extracting device connected to the power take-off hull and adapted to extract power as the buoy moves with the waves, by applying up to a predetermined maximum control force, and
    an end-stop cushioning system comprising:
        a first stage end-stop cushioning device comprising a first fluid cylinder having a first end and a second end and being adapted to apply, in an end-stop operation, an additional deceleration force on the power take-off device above the predetermined maximum control force, and
        a second stage end-stop cushioning device comprising a second fluid cylinder having a first end and a second end and being adapted to be extended like a spring in an end-stop operation after the first stage has been activated and when the power take-off force is higher than the above said predetermined maximum control force, to hold the buoy submerged through the crest of a large wave,
        wherein the first end of the first fluid cylinder is connected, directly or indirectly, to the first end of the second fluid cylinder, and
        wherein each of the second ends of the first fluid cylinder and the second fluid cylinder is connected to one of the buoy and the mooring device.

2. The power take-off system according to claim 1, wherein the first fluid cylinder is connected between the buoy and the power take-off hull, and the second fluid cylinder is connected between the power take-off hull and the mooring device, whereby the power take-off hull is essentially vertically fixed against the wave motion.

3. The power take-off system according to claim 1, wherein the power take-off hull is essentially fixedly connected to the buoy and the first fluid cylinder is connected between the power take-off hull and the second fluid cylinder, which in turn is connected to the mooring device.

4. The power take-off system according to claim 3, wherein a piston rod of the first fluid cylinder is connected to the buoy.

5. The power take-off system according to claim 1, wherein the first stage end-stop cushioning device comprises
  the first fluid cylinder being a hydraulic pre-tension cylinder
    having a cylinder tube connectable to the buoy,
    with the cylinder tube being guided in the power take-off hull between a retracted position and an extended position,
    the cylinder tube having a fluid chamber,
    having a piston rod fixed to the power take-off hull,
    a primary fluid port between the fluid chamber and a pre-tension gas accumulator assembly, being closed when the piston has reached the end of normal stroke, and
    a secondary fluid port connecting the pre-tension cylinder chamber with the pre-tension gas accumulator assembly, adapted to provide an increased pressure in the fluid chamber, only in the direction when the fluid is moving from the pre-tension cylinder to the gas accumulator assembly, when the primary fluid port is closed,
  the pre-tension gas accumulator assembly comprising
    a piston accumulator containing a fluid chamber and a gas chamber separated by a piston, with the fluid chamber being connected to the pre-tension cylinder fluid chamber, and
    gas containers, with an additional volume of compressed gas being connected to the piston accumulator gas chamber.

6. The power take-off system according to claim 5, wherein the piston rod is hollow, having a fluid chamber connecting the pre-tension cylinder chamber with the piston accumulator fluid chamber by means of a primary fluid port, and wherein a submerge cushion cavity, being defined by a cylinder closely fitted around the hollow piston rod, is attached to the bottom of the pre-tension cylinder, wherein the cushion cavity cylinder completely covers the primary fluid ports during end-stop operation.

7. The power take-off system according to claim 6, wherein the secondary fluid port comprises an over pressure relief valve between the pre-tension cylinder fluid chamber and the hollow piston rod fluid chamber by which, when the primary fluid ports are fully closed, fluid is forced from the pre-tension cylinder fluid chamber into the hollow piston rod fluid chamber, giving a constant pressure drop and thereby an increased force to decelerate and stop the relative motion between the pre-tension cylinder and the hollow piston rod.

8. The power take-off system according to claim 1, wherein the first-stage end-stop cushion device comprises end-stop buffers adapted to decelerate and stop relative motion between the first fluid cylinder and the power take-off hull during end-stop operation.

9. The power take-off system according to claim 1, wherein a pre-tension gas accumulator assembly has a fluid/volume ratio of between 1:5 and 1:10.

10. The power take-off system according to claim 1, comprising ball screw actuators provided to assist the first stage submerge end-stop cushion device by applying maximum damping when the pre-tension cylinder gets close to the end-stop cushion.

11. The power take-off system according to claim 1, wherein the second-stage end-stop cushioning device comprises a hydraulic accumulator connected to the second fluid cylinder so that the accumulator starts charging with fluid as a result of the increased force from the first stage end stop cushion.

12. The power take-off system according to claim 11, wherein the piston rod of the second fluid cylinder can extend like a spring up to a maximum distance, while the force increases gradually with the reducing volume of the gas accumulator, until the buoy motion stops and the position of the buoy is held through crests of large waves.

13. The power take-off system according to claim 1, wherein the maximum end-stop force required with the end-stop cushioning system is approximately 4 MN while the maximum total PTO control force is approximately 2 MN.

14. The power take-off system according to claim 1, comprising a level cylinder adapted to, during operation, be actuated by a level pump to adjust the height of the power take-off device above the seabed.

15. A wave energy converter unit comprising a power take-off device according to claim 1, wherein the power take-off device is connected to a buoy and a mooring device attached to a foundation on a seabed.

16. A wave energy converter unit according to claim 15, comprising a level cylinder and hydraulic accumulator assembly provided as a separate part attached to the power take-off hull.

17. The power take-off system according to claim 1, wherein at least one of the first fluid cylinder and the second fluid cylinder is a hydraulic cylinder.

* * * * *